US008858101B2

(12) United States Patent
Idera

(10) Patent No.: US 8,858,101 B2
(45) Date of Patent: Oct. 14, 2014

(54) IMAGE PICKUP APPARATUS INCLUDING BAYONET COUPLING SECTION IN LENS BARREL, AND ACCESSORY

(75) Inventor: Shuichi Idera, Kawasaki (JP)

(73) Assignee: Canon Kabushiki Kaisha (JP)

( * ) Notice: Subject to any disclaimer, the term of this patent is extended or adjusted under 35 U.S.C. 154(b) by 28 days.

(21) Appl. No.: 13/616,835

(22) Filed: Sep. 14, 2012

(65) Prior Publication Data

US 2013/0071101 A1    Mar. 21, 2013

(30) Foreign Application Priority Data

Sep. 15, 2011    (JP) .................................. 2011-201673

(51) Int. Cl.
*G03B 17/00*    (2006.01)
*G02B 7/02*    (2006.01)

(52) U.S. Cl.
USPC ........................................... 396/531; 359/828

(58) Field of Classification Search
USPC ............................ 396/531, 529; 359/828, 819
See application file for complete search history.

(56) References Cited

U.S. PATENT DOCUMENTS

| 4,247,190 A * | 1/1981 | Hashimoto et al. ............ 396/530 |
| 7,441,967 B2 * | 10/2008 | Suzuki ............................ 396/531 |
| 2001/0017740 A1 * | 8/2001 | Nomura et al. ................ 359/828 |
| 2006/0067679 A1 | 3/2006 | Suzuki |
| 2007/0020987 A1 | 1/2007 | Shirako et al. |
| 2008/0205881 A1 * | 8/2008 | Sakurai ........................... 396/530 |
| 2009/0051806 A1 | 2/2009 | Haubmann |
| 2011/0194189 A1 | 8/2011 | Ishikawa |

FOREIGN PATENT DOCUMENTS

| JP | 2004-272003 A | 9/2004 |
| JP | 2011-008970 A | 1/2011 |

OTHER PUBLICATIONS

Extended European Search Report for EP 12184199.3, mail date Jan. 11, 2013.

\* cited by examiner

*Primary Examiner* — Christopher Mahoney
(74) *Attorney, Agent, or Firm* — Rossi, Kimms & McDowell LLP

(57) ABSTRACT

An image pickup apparatus which can provide a rotational operation member around a lens barrel formed with a bayonet coupling section without increasing the apparatus size. Three female pawl grooves and three open grooves are formed in a mount base. A first ring member is formed with three male pawl portions for being engaged with the female pawl grooves and open grooves. An operation ring member is rotationally operated, and a second ring member rotates in unison therewith. Photo reflectors detect rotation of the second ring member. A restriction unit restricts rotation of the first ring member when the mount base and the operation ring member are bayonet-coupled. A rotation locking member restricts rotation of the operation ring member and the second ring member with respect to the first ring member in accordance with an operation for releasing rotation restriction of the first ring member.

24 Claims, 17 Drawing Sheets

X:CLOCKWISE ←→ Y:COUNTERCLOCKWISE

IMAGE PICKUP APPARATUS INCLUDING BAYONET COUPLING SECTION IN LENS BARREL, AND ACCESSORY

BACKGROUND OF THE INVENTION

1. Field of the Invention

The present invention relates to an image pickup apparatus, and an accessory which can be mounted on an image pickup apparatus, and more particularly to an image pickup apparatus formed with a first bayonet coupling section for mounting an accessory around a lens barrel.

2. Description of the Related Art

An image pickup apparatus is known which has a bayonet coupling section formed around a lens barrel, for mounting an accessory, such as a wide converter lens or a teleconverter lens (see Japanese Patent Laid-Open Publication No. 2004-272003). It is also known to mount a cover ring for covering the bayonet coupling section, when the accessory, such as a wide converter lens or a teleconverter lens, has been removed from the bayonet coupling section.

Further, an image pickup apparatus is known which has a rotationally operable ring member provided around a lens barrel, and enables the user to change shooting conditions by rotationally operating the ring member before shooting (see Japanese Patent Laid-Open Publication No. 2011-008970).

In a case where a bayonet coupling section for mounting an accessory is formed around a lens barrel, and a rotationally operable ring member is provided around the lens barrel, it is envisaged to provide the ring member outside the bayonet coupling section formed around the lens barrel.

However, this arrangement causes a problem that the diameter of the ring member becomes large, which hinders downsizing of the image pickup apparatus.

SUMMARY OF THE INVENTION

The present invention provides an image pickup apparatus which makes it possible to form a bayonet coupling section around a lens barrel, for mounting an accessory, and provide a rotational operation member around the lens barrel, without increasing the size of the image pickup apparatus.

In a first aspect of the present invention, there is provided an image pickup apparatus comprising a first bayonet coupling section which is formed around a lens barrel, a first member configured to have a second bayonet coupling section formed thereon, the second bayonet coupling section being capable of being engaged with the first bayonet coupling section, a rotational operation member configured to rotate with respect to the first member, by being rotationally operated by a user, a second member configured to rotate in unison with the rotational operation member when the rotational operation member is rotationally operated by the user, a detection unit configured to detect rotation of the second member, a first lock member configured to restrict rotation of the first member with respect to the first bayonet coupling section when the first bayonet coupling section and the second bayonet coupling section are engaged with each other, and a second lock member configured to restrict rotation of the rotational operation member and the second member with respect to the first member in accordance with an operation for releasing rotation restriction of the first member.

In a second aspect of the present invention, there is provided an accessory that can be mounted on an image pickup apparatus having a first bayonet coupling section formed around a lens barrel, comprising a first member configured to have a second bayonet coupling section formed thereon, the second bayonet coupling section being capable of being engaged with the first bayonet coupling section, a rotational operation member configured to rotate with respect to the first member, by being rotationally operated by a user, a second member configured to rotate in unison with the rotational operation member when the rotational operation member is rotationally operated by the user, and a lock member configured to restrict rotation of the rotational operation member and the second member with respect to the first member in accordance with an operation for dismounting the accessory from the image pickup apparatus.

According to the present invention, it is possible to form the bayonet coupling section around the lens barrel, for mounting an accessory, and provide the rotational operation member around the lens barrel, without increasing the size of the image pickup apparatus.

Further features of the present invention will become apparent from the following description of exemplary embodiments with reference to the attached drawings.

BRIEF DESCRIPTION OF THE DRAWINGS

FIGS. 1A and 1B are views of an electronic still camera according to the present embodiment, in which FIG. 1A shows a front perspective view, and FIG. 1B shows a rear perspective view.

FIGS. 3A and 3B are exploded perspective views of a mount base disposed on the camera housing of the electronic still camera shown in FIGS. 1A and 1B, in which FIG. 3A shows an exploded perspective view as viewed from the front, and FIG. 3B shows an exploded perspective view as viewed from the rear.

FIGS. 4A and 4B are views of the mount base shown in FIGS. 3A and 3B, in which FIG. 4A shows a front view, and FIG. 4B shows a side cross-sectional view.

FIGS. 5A and 5B are exploded perspective views of the operation ring mounted on the camera housing of the electronic still camera shown in FIGS. 1A and 1B, in which FIG. 5A shows an exploded perspective view as viewed from the front, and FIG. 5B shows an exploded perspective view as viewed from the rear.

FIGS. 6A and 6B are views of the operation ring shown in FIGS. 5A and 5B, in which FIG. 6A shows a rear view, and FIG. 6B shows a side cross-sectional view.

FIGS. 7A and 7B are views showing a state in which the operation ring shown in FIGS. 5A and 5B has been mounted on the mount base shown in FIGS. 3A and 3B, in which FIG. 7A shows a front view, and FIG. 7B shows a side view.

FIGS. 8A and 8B are front cross-sectional views of the operation ring shown in FIGS. 5A and 5B and the mount base shown in FIGS. 3A and 3B, in which FIG. 8A shows a state before the operation ring and the mount base are bayonet-coupled, and FIG. 8B shows a state after the operation ring and the mount base have been bayonet-coupled.

FIGS. 9A to 9D are side cross-sectional views of the operation ring shown in FIGS. 5A and 5B and the mount base shown in FIGS. 3A and 3B useful in explanation of a bayonet coupling process, in which FIG. 9A shows a state before being bayonet-coupled, FIG. 9B shows a state in the process of being bayonet-coupled, FIG. 9C shows a locked state after being bayonet-coupled, and FIG. 9D shows a state in which the locked state is released after being bayonet-coupled.

FIGS. 13A and 13B are exploded perspective views of a ring adapter bayonet-coupled to the mount base shown in FIGS. 3 and 3B, as viewed from the rear, in which FIG. 13A shows an upper side, and FIG. 13B shows a lower side.

FIGS. 14A and 14B are views showing a state in which the ring adapter shown in FIGS. 13A and 13B has been mounted on the mount base, in which FIG. 14A shows a font view, and FIG. 14B shows a side cross-sectional view.

FIGS. 16A and 16B are views of a lens adapter which is bayonet-coupled to the mount base shown in FIGS. 3A and 3B, in which FIG. 16A shows a font view, and FIG. 16B shows a rear perspective view.

FIGS. 17A and 17B are views showing a state in which the lens adapter shown in FIGS. 16A and 16B has been mounted on the mount base, in which FIG. 17A shows a front view, and FIG. 17B shows a side cross-sectional view.

DESCRIPTION OF THE EMBODIMENTS

The present invention will now be described in detail below with reference to the accompanying drawings showing embodiments thereof. Although in the present embodiment, an electronic still camera will be described as an example of an image pickup apparatus, the present embodiment is not limited to this.

Figure 1A:
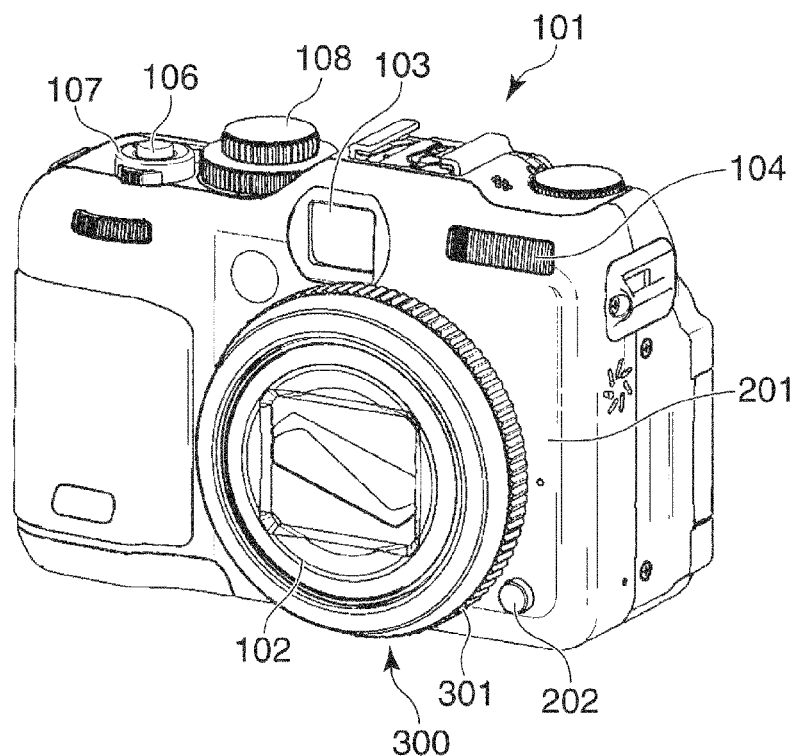
Figure 1B:
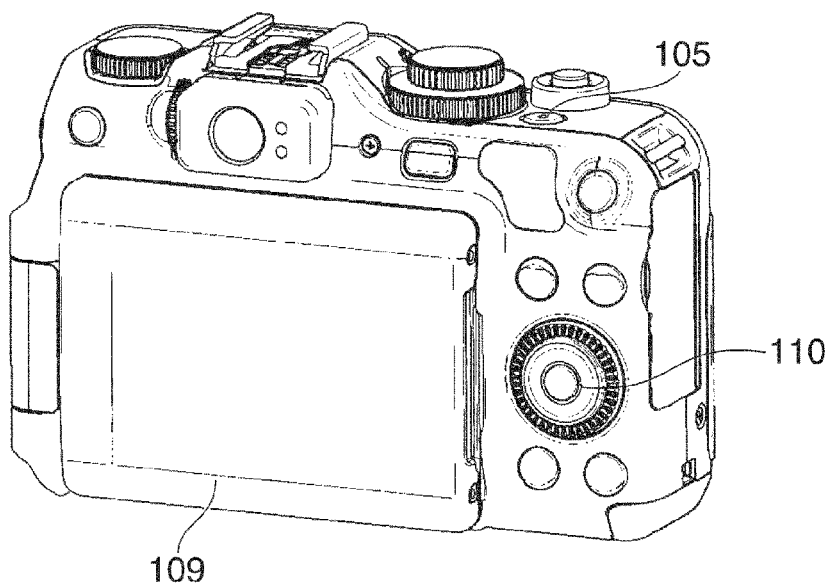

FIGS. 1A and 1B are views of the electronic still camera according to the present embodiment, in which FIG. 1A shows a front perspective view, and FIG. 1B shows a rear perspective view. The electronic still camera, denoted by reference numeral 101, includes a front cover 201, a lens barrel 102, and a finder 103. The front cover 201 is disposed on the front surface of a camera housing which is a main body of the electronic still camera 101, as an exterior of the camera housing. The lens barrel 102 constitutes an image pickup optical system of the electronic still camera 101, and an optical system of the finder 103 cooperates with the image pickup optical system of the lens barrel 102 so as to enable a photographer to view an object image through the finder 103.

The electronic still camera 101 further includes a strobe 104, a power button 105, a release button 106, a zoom lever 107, a mode dial 108, a liquid-crystal display panel 109, and an operation dial 110. The strobe 104 irradiates an object with light, and the power button 105 switches on and off of the electronic still camera 101. By depressing the release button 106, shooting is performed, and by moving the lens barrel 102 using the zoom lever 107, it is possible to adjust an angle of a photographic image. It is possible to change a shooting mode and the like by operating the mode dial 108, and photographic images and various kinds of information, such as shooting conditions, are displayed on the liquid-crystal display panel 109. The operation dial 110 is rotatable clockwise and counterclockwise, and a push operation is possible at the four points of the left, right, top, and bottom, and at the one point of the center.

The electronic still camera 101 further includes an operation ring 300, and an operation member 202 for locking and unlocking bayonet coupling between the operation ring 300 and the camera housing. As described hereinafter, a first ring member 302 (not shown in FIGS. 1A and 1B; see FIGS. 5A and 5B) forming the operation ring 300, and a mount base 203 (see FIG. 3) mounted on the camera housing are bayonet-coupled.

As will be described hereinafter, the operation ring 300 is basically formed by an operation ring member 301, the first ring member 302, and a second ring member 305 (see FIGS. 5A and 5B), and the operation ring member 301 and the second ring member 305 hold the first ring member 302 in a sandwiching manner. A photographer can change shooting conditions by rotationally operating the operation ring member 301 in a state in which the operation ring 300 is mounted on the camera housing. The operation ring member 301, the first ring member 302, and the second ring member 305 correspond to a rotational operation member, a first member, and a second member, respectively, in the claims appended hereto.

When the power button 105 is pressed to start the electronic still camera 101, the lens barrel 102 is extended to the wide position. By operating the mode dial 108, the mode of the camera 101 is adjusted e.g. to Tv: shutter speed priority AE mode. It is assumed here that a value of the shutter speed is set to 1/60.

When the operation ring 301 is rotated clockwise as viewed from the rear (from a photographer side) by an amount corresponding to one click, the shutter speed is set to a value adjacent to the currently set value, e.g. 1/50. On the other hand, when the operation ring 301 is rotated counterclockwise by an amount corresponding to one click, the shutter speed is set to the other adjacent value, e.g. 1/80. The set value is thus changed according to an amount of rotation of the operation ring member 301, and for example, when the operation ring member 301 is rotated clockwise by an amount corresponding to three clicks, the shutter speed is sequentially shifted from 1/60 to 1/50, from 1/50 to 1/40, and from 1/40 to 1/30, whereby it is set to 1/30. Note that the set value can be confirmed on a through-the-lens image used in shooting and a display on the liquid-crystal display panel 109. A clicking mechanism provided for the operation ring 300, and a mechanism for detecting a rotational direction and a rotational amount of the operation ring member 301 will be described hereinafter.

Parameters which can be set by the operation of the operation ring member 301 include a shutter speed, an ISO speed, an exposure value, an aperture value, a white balance, a zoom position of the lens barrel 102, and an in-focus position in a manual focus mode, any of which can be selected as desired. Although it is described hereinabove that by operating the operation ring member 301 when in the shutter speed priority AE mode, the shutter speed is changed, when the shooting mode is set to a mode other than the shutter speed priority AE mode, basically, an operation can be performed using the operation ring member 301 in the same manner except that a parameter which can be set is different. For example, when the shooting mode is set to a manual mode, it is possible to change the shutter speed by operating the operation ring member 301, and change the aperture value by operating the operation dial 110. Further, in a reproduction mode for reproducing a photographic image, it is also possible to forward an image or zoom in or out the image by operating the operation ring member 301.

Figure 2:
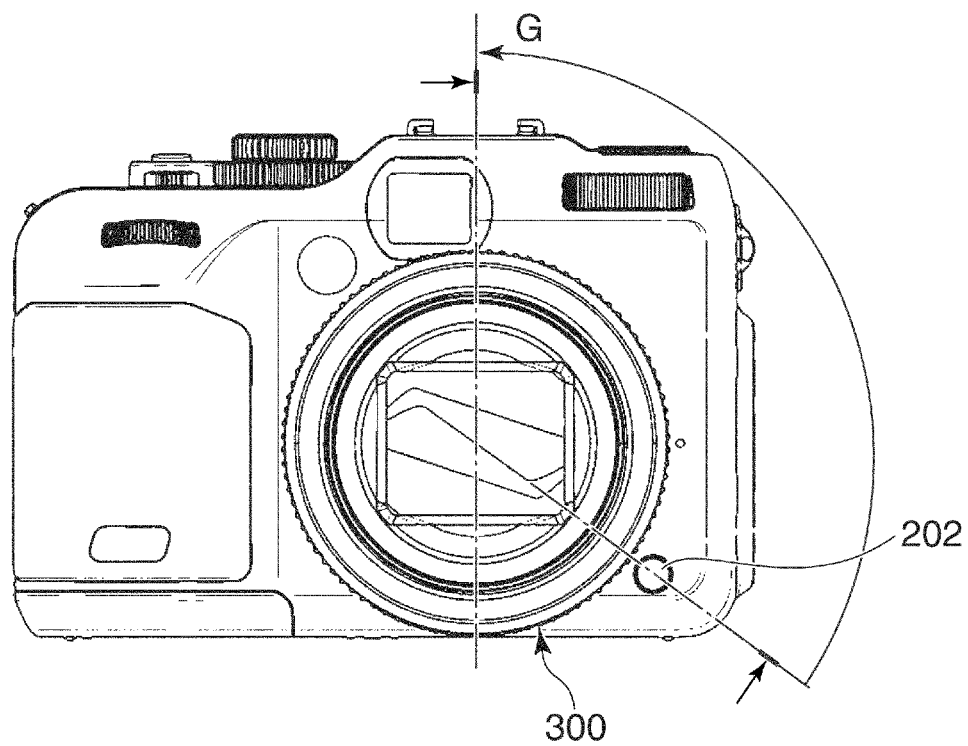
FIG. 2 is a front view showing a positional relationship between an operation ring and an operation member which are mounted on a camera housing of the electronic still camera shown in FIGS. 1A and 1B.

FIG. 2 is a front view showing a positional relationship between the operation ring 300 and the operation member 202 which are mounted on the camera housing. Although in the present embodiment, the operation member 202 is provided to the lower right of the operation ring 300, as viewed from the front side of the electronic still camera 101, in the drawings referred to in the following description, the operation member 202 and the operation ring member 301 are shown in a state rotated in a direction of an arrow G, as appropriate. That is, the operation member 202 is illustrated at a vertically upper portion of drawings, as appropriate.

Figure 3A:
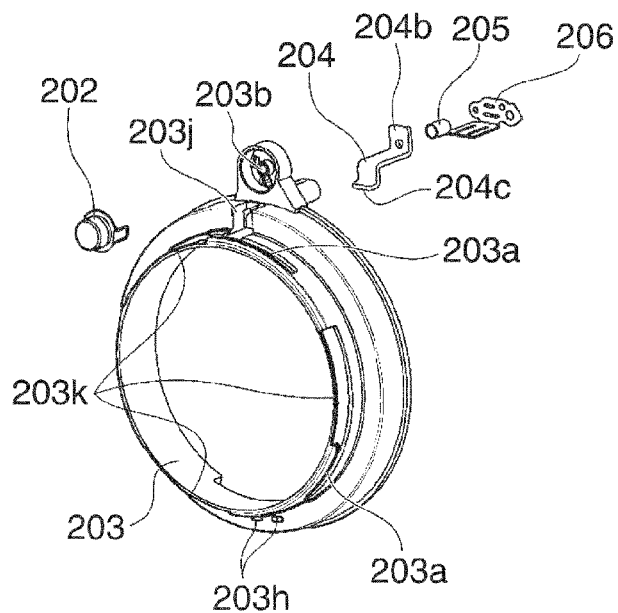
Figure 3B:
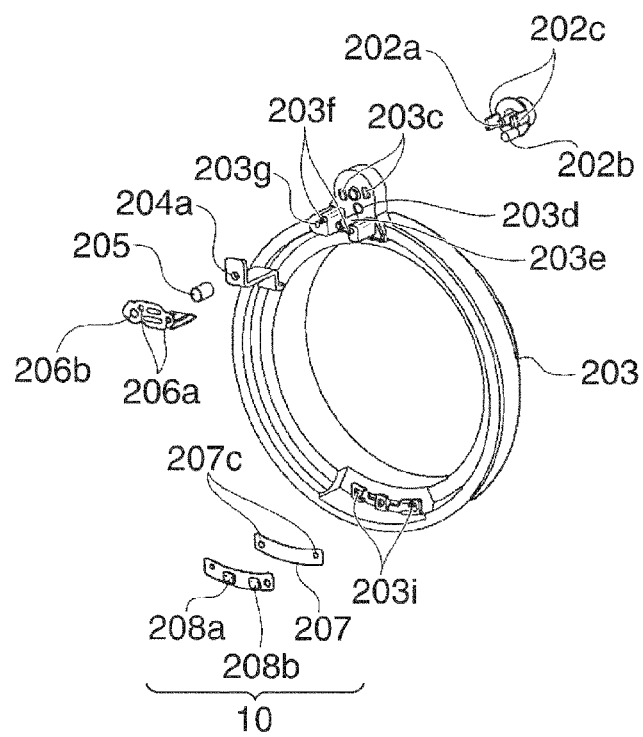
Figure 4A:
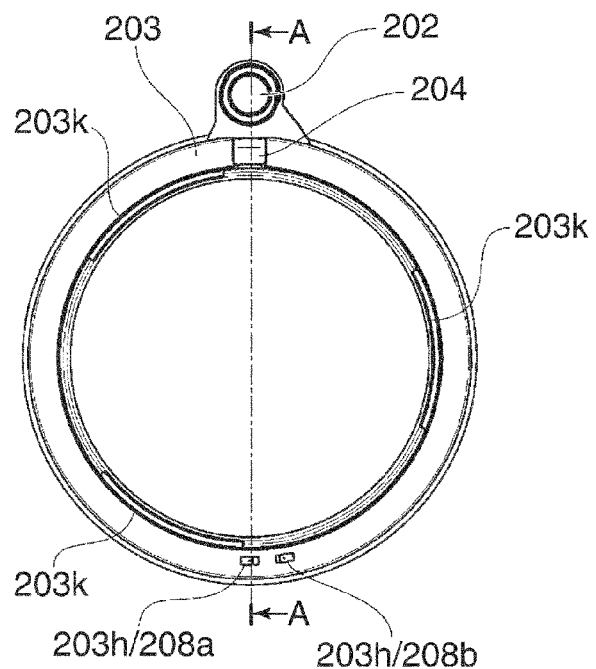
Figure 4B:
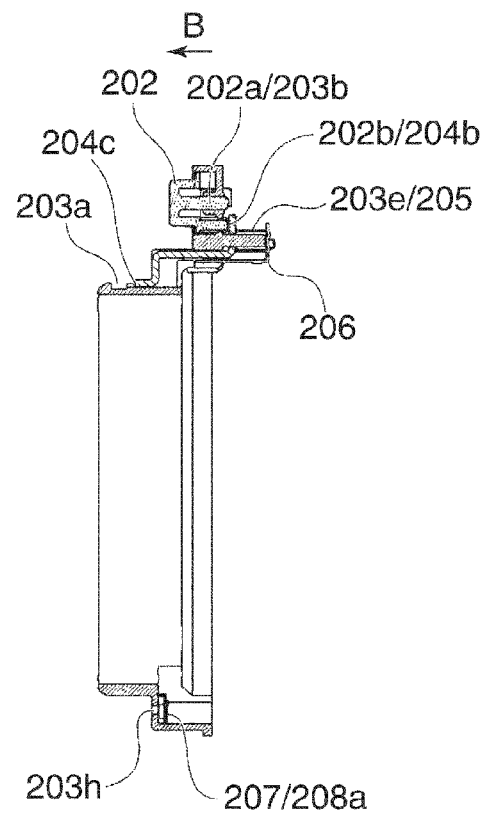

The mount base 203 is a member which is disposed on the camera housing and to which the first ring member 302 constituting the operation ring 300 is bayonet-coupled. FIGS. 3A and 3B are exploded perspective views of the mount base 203, in which FIG. 3A shows the exploded perspective view as viewed from the front, and FIG. 3B shows the exploded perspective view as viewed from the rear. FIGS. 4A and 4B are views of the mount base 203, in which FIG. 4A shows a front view, and FIG. 4B shows a side cross-sectional view (taken as indicated by arrows A-A in FIG. 4A).

The mount base 203 is formed with three female pawl grooves 203a and three open grooves 203k for being bayonet-coupled to (the first ring member 302 of) the operation ring 300. The mount base 203 is disposed such that the three female pawl grooves 203a and the three open grooves 203k are located around the lens barrel 102. Therefore, the three female pawl grooves 203a and the three open grooves 203k function as a first bayonet coupling section for mounting an accessory around the lens barrel. A boss 202a formed on the operation member 202 is slidably fitted in a hole 203b formed in the mount base 203. Further, a boss 202b formed on the operation member 202 is slidably fitted and locked in a hole 203d formed in the mount base 203. Further, pawl portions 202c formed on the operation member 202 are inserted through holes 203c formed in the mount base 203, respectively, and by using a latch mechanism, such as a snap-fit structure, for these components, the operation member 202 is held by the mount base 203.

A lock member 204 is slidably fitted and locked in an opening 203j formed in the mount base 203, and can advance and retract in an optical axis direction. A boss 203e formed on the mount base 203 is slidably fitted in a hole 204a formed in the lock member 204. Bosses 203f formed on the mount base 203 are fitted in holes 206a formed in a holder member 206, respectively. A hole 203g formed in the mount base 203 and a hole 206b formed in the holder member 206 are fixed e.g. by fixing means, such as a screw, not shown. The boss 203e of the mount base 203 has a lock spring 205 provided thereon between the lock member 204 and the holder member 206, for urging the lock member 204 in a direction of an arrow B (see FIG. 4B).

The lock member 204 includes an engaging end face 204c for being engaged with the first ring member 302 constituting the operation member 300. Details of the function of the lock member 204 will be described when describing a method of mounting and dismounting the operation ring 300 on and from the mount base 203.

A detection unit 10 for detecting a rotational direction and a rotational amount of the operation ring member 301 includes photo reflectors 208a and 208b (first and second photo reflectors) mounted on a flexible printed circuit board 207 e.g. by means of soldering. The photo reflectors 208a and 208b are exposed to the front side of the mount base 203 through holes 203h formed in the mount base 203.

Bosses 203i formed on the mount base 203 are fitted in holes 207c formed in the flexible printed circuit board 207, respectively, and the flexible printed circuit board 207 is fixed to the mount base 203 by adhesive means, such as a double-sided tape. Although not shown, contact portions of the flexible printed circuit board 207 are connected to a main substrate on which a semiconductor device and the like are mounted for image processing and system processing of the electronic still camera 101, via connectors, for electrical conduction.

Figure 5A:
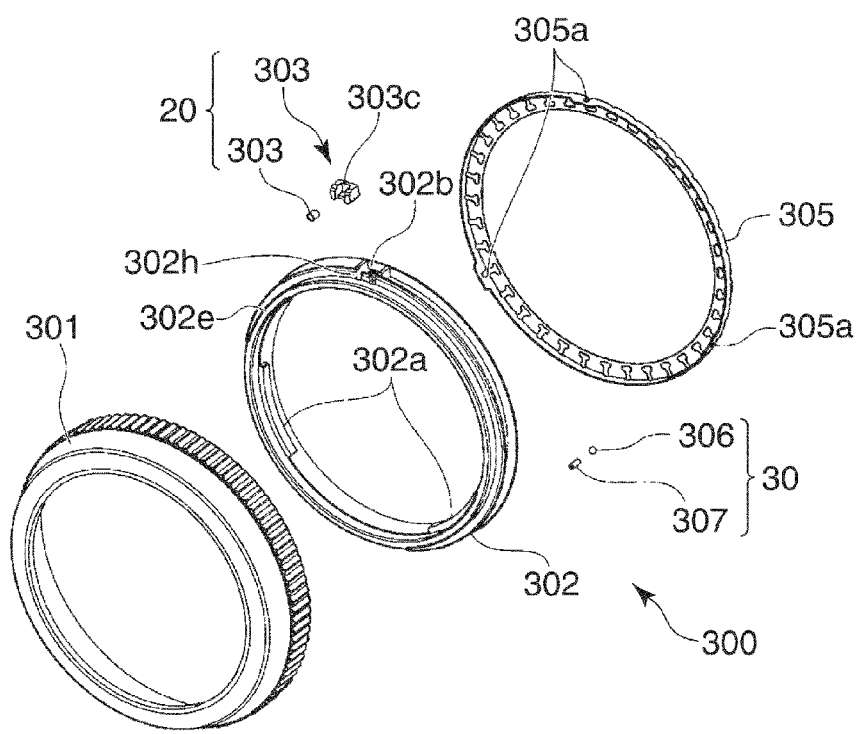
Figure 5B:
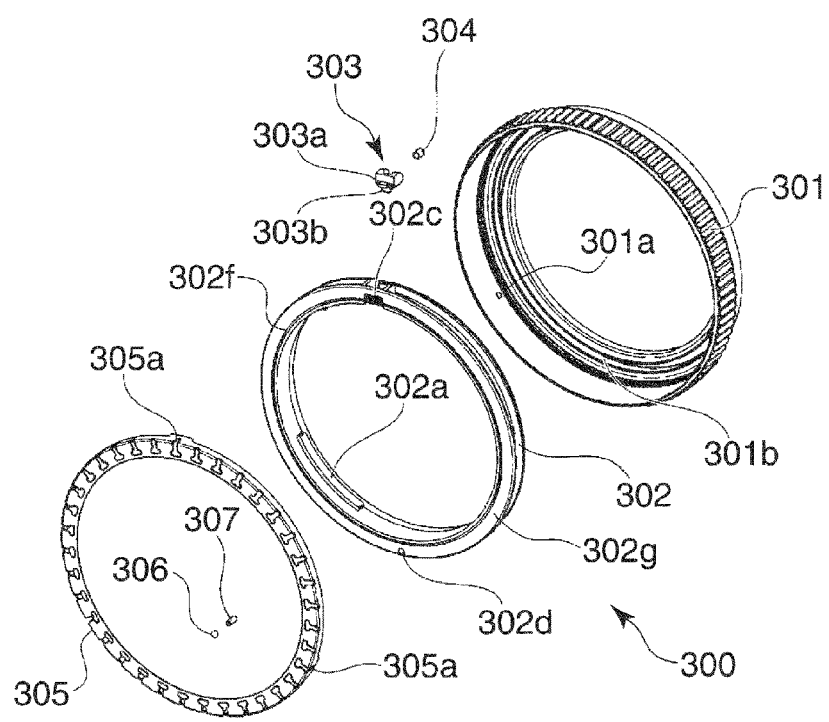
Figure 6A:
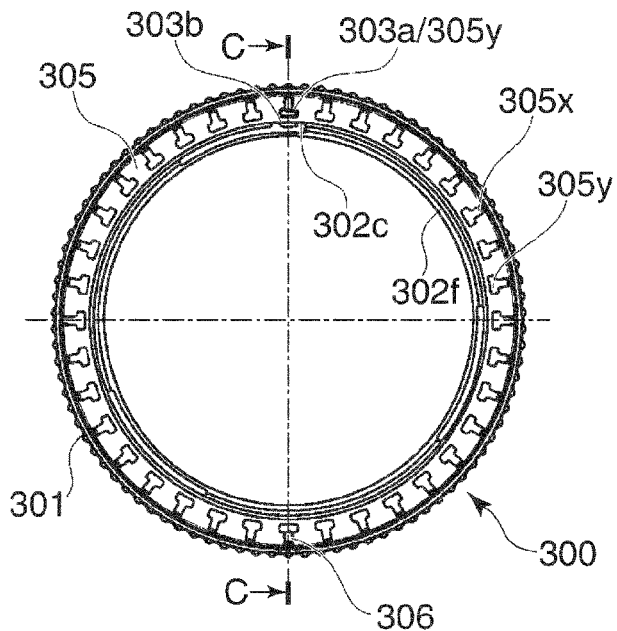
Figure 6B:
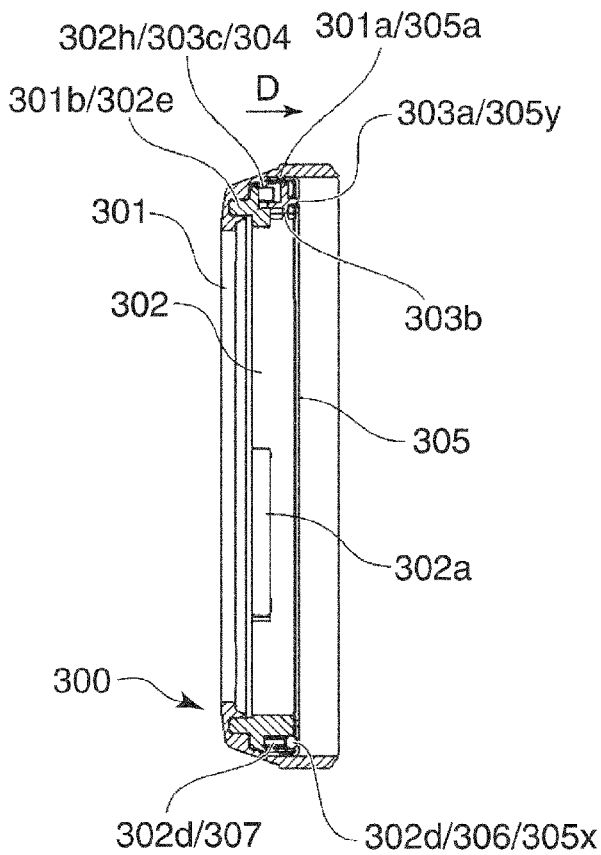

FIGS. 5A and 5B are exploded perspective views of the operation ring 300, in which FIG. 5A shows an exploded perspective view as viewed from the front, and FIG. 5B shows an exploded perspective view as viewed from the rear. FIGS. 6A and 6B are views of the operation ring 300, in which FIG. 6A shows a rear view, and FIG. 6B shows a side cross-sectional view (taken as indicated by arrows C-C in FIG. 6A). The operation ring 300 comprises the operation ring member 301 which can be manually operated by a photographer, the first ring member 302 which is bayonet-coupled to the mount base 203, and the second ring member 305 which rotates in unison with the operation ring member 301.

The first ring member 302 includes male pawl portions 302a formed thereon at three locations for being bayonet-coupled to the mount base 203. The male pawl portions 302a function as a second bayonet coupling section which can be coupled and decoupled to and from the first bayonet coupling section. A restriction unit 20 which restricts the rotation of the operation ring member 301 comprises a rotation locking member 303 and a rotation locking spring 304. The rotation locking member 303 is slidably fitted and latched in a recess 302b formed in the first ring member 302. Further, the rotation locking spring 304 is disposed between a rib 302h formed on the first ring member 302 and a wall 303c formed on the rotation locking member 303, and urges the rotation locking member 303 in a direction of an arrow D (see FIG. 6B).

A rib 302e formed on the first ring member 302 is slidably fitted and latched in a groove 301b formed in the operation ring member 301. A clicking unit 30 that provides a click feeling to a photographer when the operation ring member 301 is rotated comprises a clicking spring 307 and a steel ball 306. The clicking spring 307 and the steel ball 306 are disposed in a hole 302d formed in the first ring member 302.

Three pawl portions 301a formed on the operation ring member 301 and three holes 305a formed in the second ring member 305 are engaged with each other, respectively, whereby the first ring member 302 is retained from coming off in the optical axis direction. The operation ring member 301 thus made integral with the second ring member 305 is rotatably held on the first ring member 302.

The steel ball 306 is disposed in a position where the center thereof is substantially aligned with the center of an opening 305x formed in a surface of the second ring member 305, which is perpendicular to the optical axis direction, such that part of the steel ball 306 sinks in the opening 305x. The opening 305x is formed in plurality in the second ring member 305 such that the openings 305x are circumferentially spaced at regular intervals. The steel ball 306 is urged toward the second ring member 305 by an urging force of the clicking spring 307. A rib 303a formed on the rotation locking member 303 is urged toward the second ring member 305 by an urging force of the rotation locking spring 304, and is fitted and latched in an opening 305y of the second ring member 305 when the operation ring 300 is not mounted on the camera housing. This restricts the operation ring member 301 and the second ring member 305 from rotating with respect to the first ring member 302. The opening 305y is formed in plurality in the second ring member 305 at regular circumferentially spaced intervals. In the claims appended hereto, the openings 305y correspond to first openings, and the openings 305x correspond to second openings. Each opening 305x has a smaller width than each opening 305y.

The engaging end face 204c of the lock member 204 is brought into abutment with a receiving surface 302f formed on the first ring member 302, as described hereinafter. A surface of the second ring member 305 in which the openings 305y are formed is opposed to a surface 302g of the first ring member 302 which is irradiated with light beams emitted from the photo reflectors 208a and 208b, as described hereinafter.

Although in the present embodiment, the operation ring member 301 and the second ring member 305 are engaged with each other at three locations at intervals of 120 degrees, the manner of the engagement is not limited to this. For example, if the size of the camera housing allows, the operation ring member 301 may be fixed to the second ring member 305 with screws.

Figure 7A:
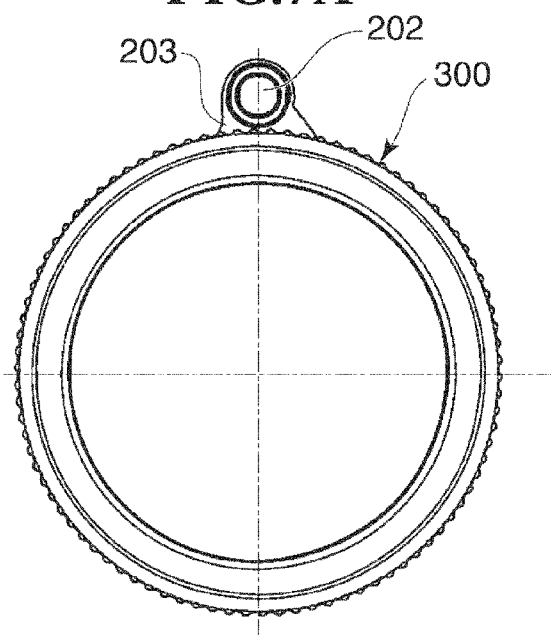
Figure 7B:
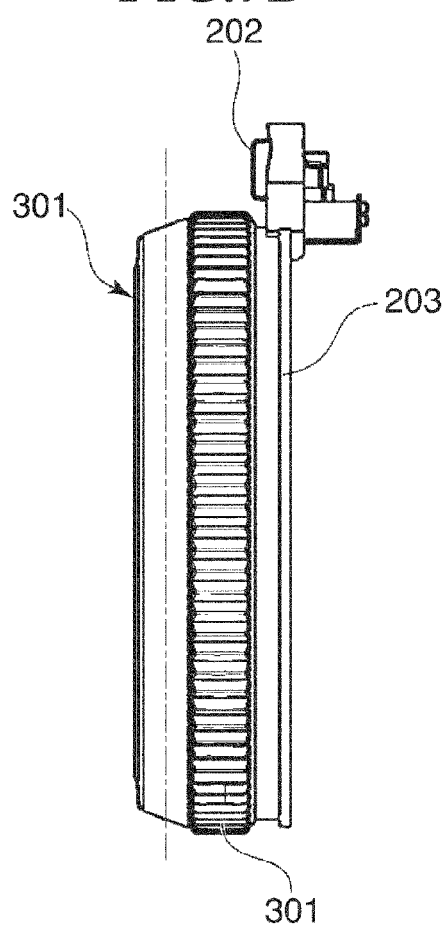
Figure 8A:
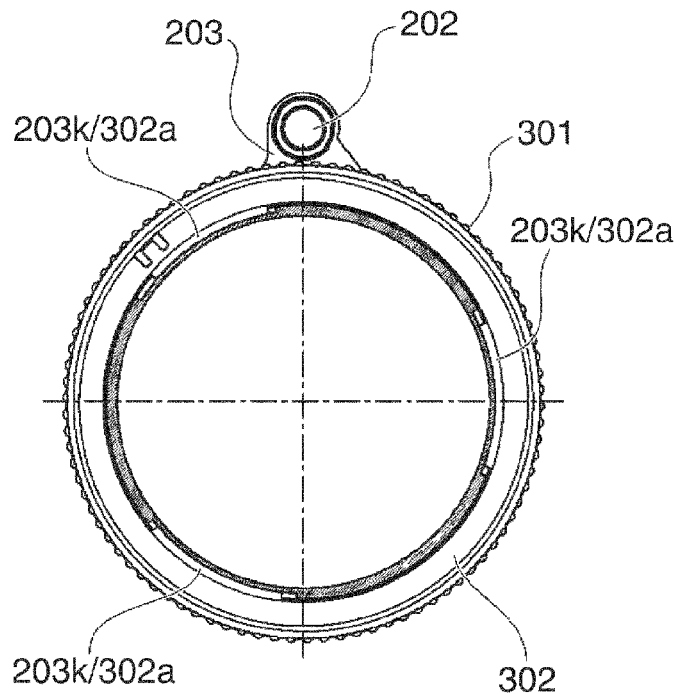
Figure 8B:
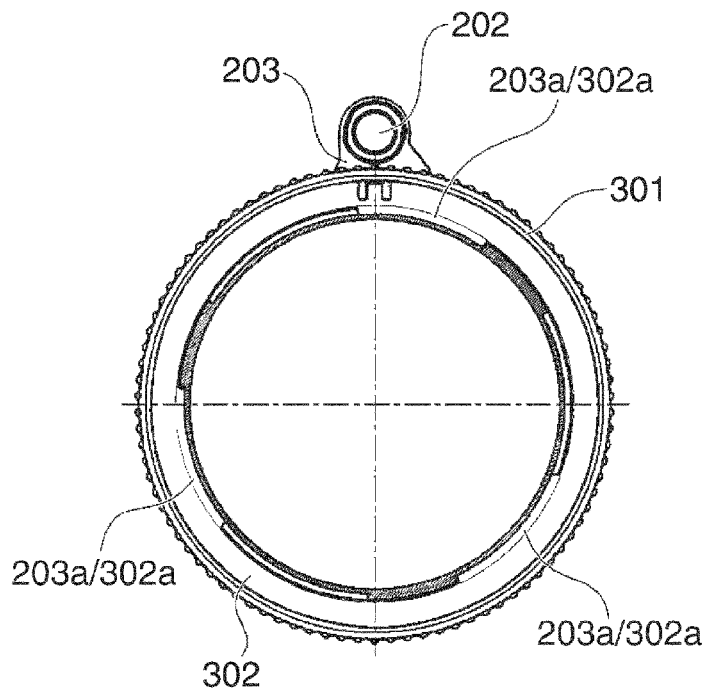

FIGS. 7A and 7B are views showing a state in which the operation ring 300 has been mounted on the mount base 203, in which FIG. 7A shows a front view, and FIG. 7B shows a side view. FIGS. 8A and 8B are front cross-sectional views of the operation ring 300 and the mount base 203, in which FIG. 8A shows a state before the operation ring 300 and the mount base 203 are bayonet-coupled, and FIG. 8B shows a state after the operation ring 300 and the mount base 203 have been bayonet-coupled.

In a state in which the operation ring 300 is not mounted on the mount base 203, the operation ring member 301 and the second ring member 305 are restricted from rotation with respect to the first ring member 302. Therefore, the photographer or the like, first, holds the operation ring member 301, and aligns the three male pawl portions 302a formed on the first ring member 302 to the three opening grooves 203k formed in the mount base 203. The photographer or the like, next, pushes the operation ring 300 toward the mount base 203 in the optical axis direction (toward the non-object side), and performs a rotational operation for rotating the operation ring member 301 clockwise up to an end stop. This causes the three male pawl portions 302a of the first ring member 302 to be engaged with the three female pawl grooves 203a of the mount base 203, respectively.

Figure 9A:
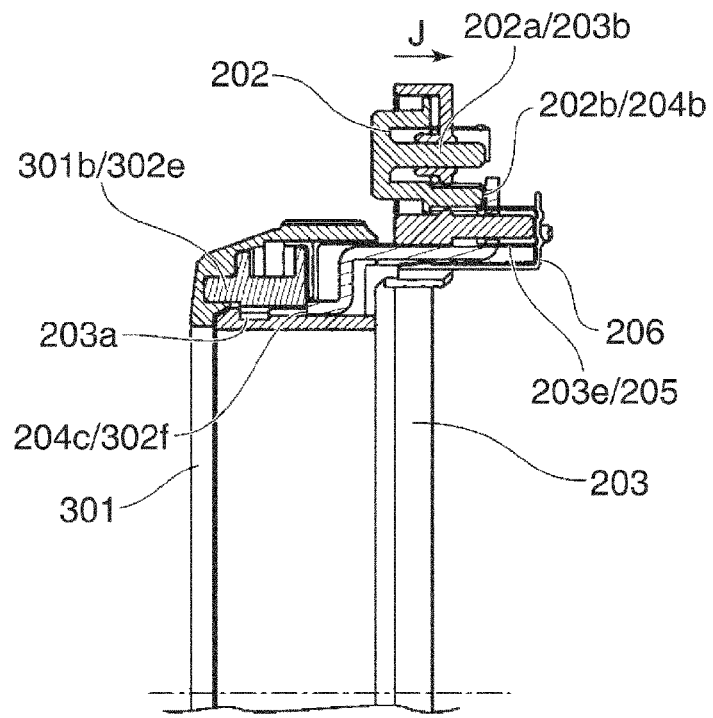
Figure 9B:
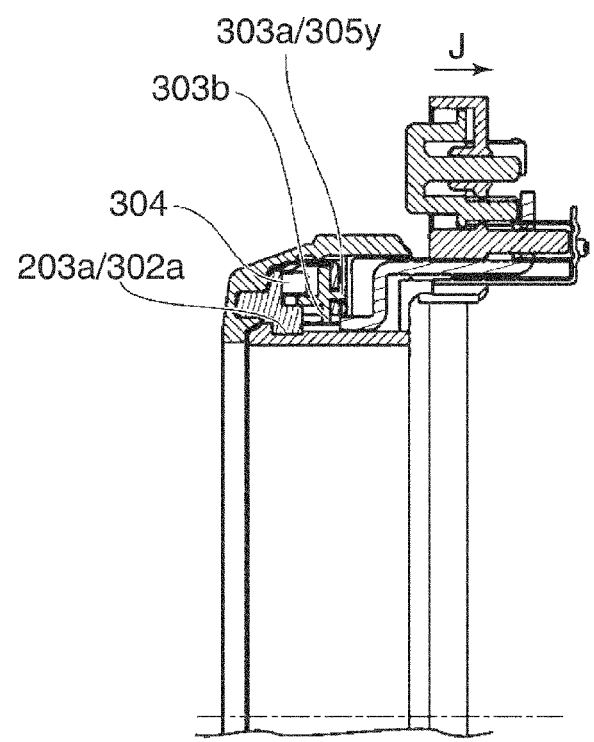
Figure 9C:
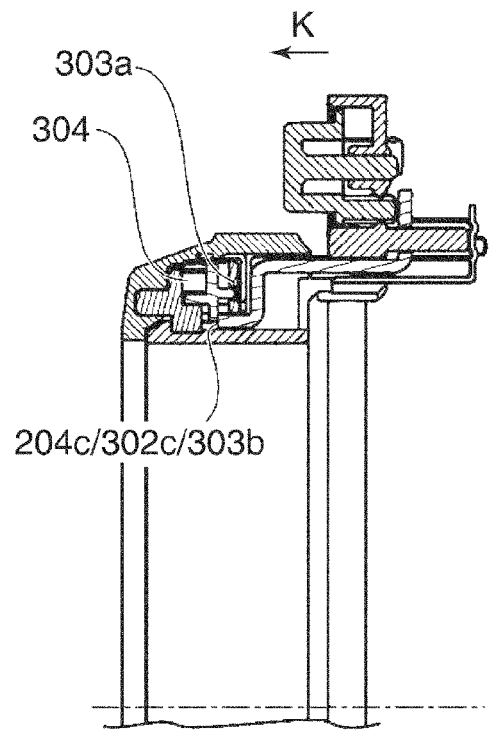
Figure 9D:
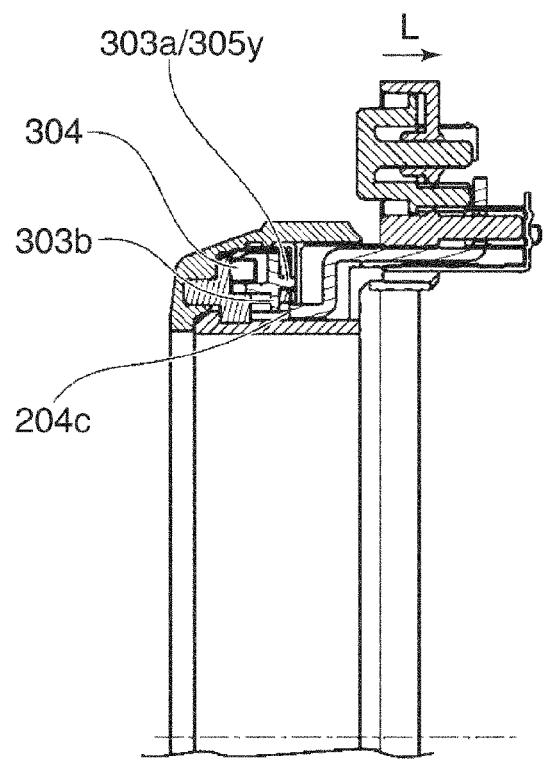

FIGS. 9A to 9D are side cross-sectional views of the operation ring 300 and the mount base 203 useful in explanation of a bayonet coupling process, in which FIG. 9A shows a state before being bayonet-coupled, FIG. 9B shows a state in the process of being bayonet-coupled, FIG. 9C shows a locked state after being bayonet-coupled, and FIG. 9D shows a state in which the locked state is released after being bayonet-coupled.

As shown in FIG. 9A, the three male pawl portions 302a of the first ring member 302 restricted from rotation and the three opening grooves 203k of the mount base 203 are aligned, and the operation ring 300 is pushed toward the mount base 203 in the optical axis direction (toward the non-object side). This causes the engaging end face 204c of the lock member 204 to be pushed by the receiving surface 302f of the first ring member 302 in a direction of an arrow J against the urging force of the lock spring 205. At the same time, a receiving surface 204b of the lock member 204 moves in the direction of the arrow J, which eliminates the urging force of the lock spring 205 which urges the boss 202b on the operation member 202, whereby the operation member 202 is set to be free, and is moved by self weight in the direction of the arrow J.

As shown in FIG. 9B, while holding the engaging end face 204c of the lock member 204 in a state pushed by the receiving surface 302f of the first ring member 302 in the direction of the arrow J, the operation ring member 301 is rotated clockwise up to an end stop. This causes the three male pawl portions 302a of the first ring member 302 to be engaged with the three female pawl grooves 203a of the mount base 203, respectively. Simultaneously with the timing of this engagement, the engaging end face 204c of the lock member 204 being pushed by the receiving surface 302f of the first ring member 302 is moved by the urging force of the lock spring 205 in a direction of an arrow K, and is engaged with a groove 302c of the first ring member 302.

As a consequence, the first ring member 302 is held in a state restricted from rotation with respect to the mount base 203, as shown in FIG. 9C. At the same time, the receiving surface 204b of the lock member 204 moves in the direction of the arrow K, and the operation member 202 also moves in the direction of the arrow K because the receiving surface 204b is in abutment with the boss 202b on the operation member 202. At this time, the engaging end face 204c of the lock member 204 moves a receiving surface 303b of the rotation locking member 303 against the urging force of the rotation locking spring 304. This causes the rib 303a of the rotation locking member 303 to be removed from one of the openings 305y of the second ring member 305, so that the operation ring member 301 and the second ring member 305 are permitted to rotate in unison. Further, the clicking spring 307 and the steel ball 306 disposed in the hole 302d of the first ring member 302 makes it possible for the user to feel a click when the operation ring member 301 is rotated.

As shown in FIG. 9D, when the operation ring 300 is dismounted from the mount base 203, the photographer or the like pushes the operation member 202 in a direction of an arrow L against the urging force of the lock spring 205. This causes the boss 202b of the operation member 202 to move the receiving surface 204b of the lock member 204 in the direction of the arrow L, whereby the engaging end face 204c of the lock member 204 is removed from the groove 302c of the first ring member 302. At this time, the rib 303a of the rotation locking member 303 is engaged with one of the openings 305y of the second ring member 305 by the urging force of the rotation locking spring 304, which restricts the rotation of the operation ring member 301 and the second ring member 305. More specifically, the rotation locking member 303 locks the second ring member 305 such that the operation ring member 301 and the second ring member 305 do not rotate with respect to the first ring member 302 in accordance with an operation of the operation member 202 by the user.

Then, when the photographer or the like rotates the operation ring member 301 counterclockwise up to an end stop, the three male pawl portions 302a formed on the first ring member 302 are moved to the three opening grooves 203k formed in the mount base 203. Therefore, by pulling the operation ring member 301 up toward the object side in the optical axis direction, the operation ring 300 is dismounted from the mount base 203.

Figure 10:
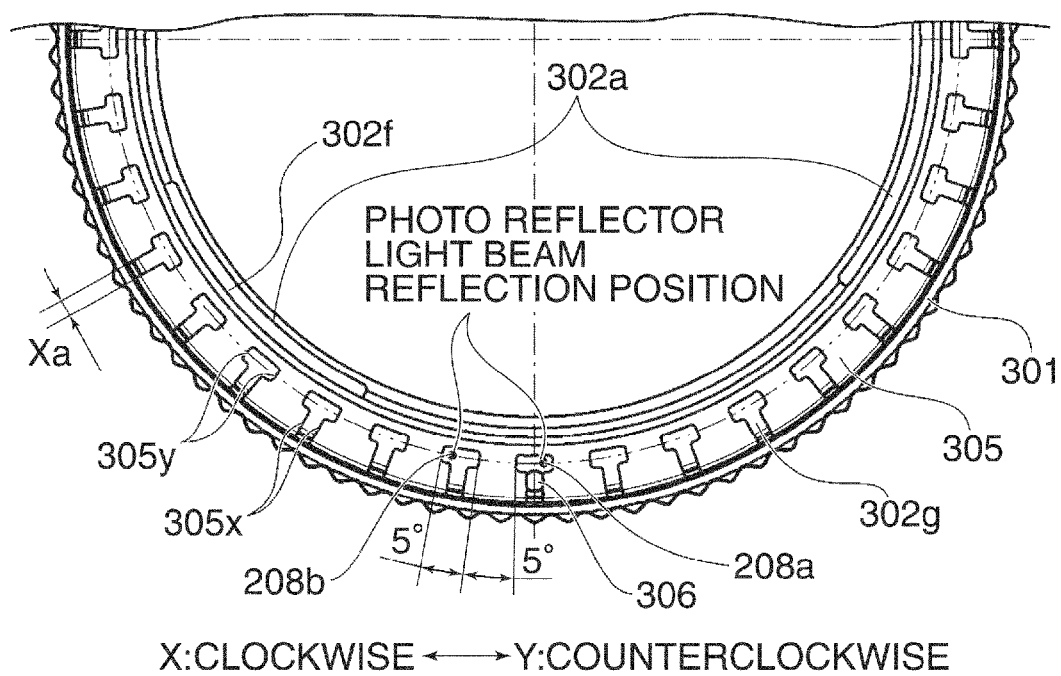
FIG. 10 is a rear enlarged view of a second ring member forming the operation ring shown in FIGS. 5A and 5B.

A description will be given of the clicking mechanism used when the operation ring member 301 is rotationally operated with reference to FIG. 10. FIG. 10 is a rear enlarged view of the second ring member 305. The second ring member 305 has a plurality of T-shaped openings (openings 305x and 305y) formed in a surface thereof perpendicular to the optical axis direction at regular circumferentially spaced intervals, and in the present embodiment, a total of 36 openings are formed at intervals of 10 degrees. In the present embodiment, of each T-shaped opening, the opening 305x having a narrower width is used for click feeling generation purposes, and the opening 305y having a wider width is used for detection of the rotational direction and the rotational amount of the operation ring member 301. By forming openings for click feeling generation and detection of rotation in the surface perpendicular to the optical axis direction, it is possible to reduce the thickness of the operation ring 300, and prevent the electronic still camera 101 from becoming large in size even when the operation ring function is added.

Although in the present embodiment, the total of 36 T-shaped openings are provided at intervals of 10 degrees, this is not limitative, but the T-shaped openings can be provided in suitable number at suitable intervals according to the sizes of the operation ring member 301 and the second ring member 305 or a desired operation feeling.

The steel ball 306 is disposed in a position where the center thereof is substantially aligned with the center of an opening 305x formed in the surface of the second ring member 305 perpendicular to the optical axis direction, in a state urged toward the second ring member 305 by the clicking spring 307. When the operation ring member 301 is rotationally operated, the second ring member 305 is also rotated in unison, and hence a state in which the steel ball 306 is engaged with each opening 305x of the second ring member 305 and a state in which the steel ball 306 is slid on the surface of the second ring member 305 are switched, which generates a click feeling. By adjusting a width Xa of each opening 305x of the second ring member 305 according to a diameter of the steel ball 306, or by adjusting the urging force of the clicking spring 307, it is possible to obtain a desired clicking force (click feeling).

Figure 11:
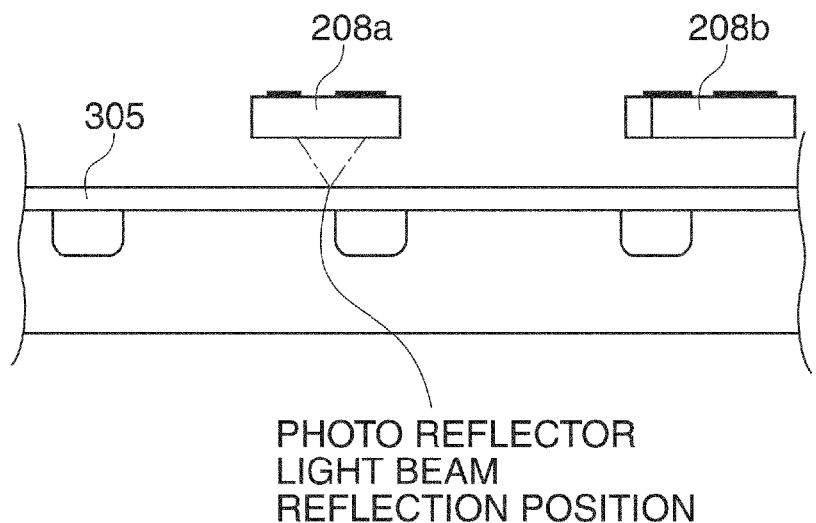
FIG. 11 is a side view showing a positional relationship between the second ring member shown in FIG. 10 and photo reflectors for detecting a rotational direction and a rotational amount of the second ring member.
Figure 12:
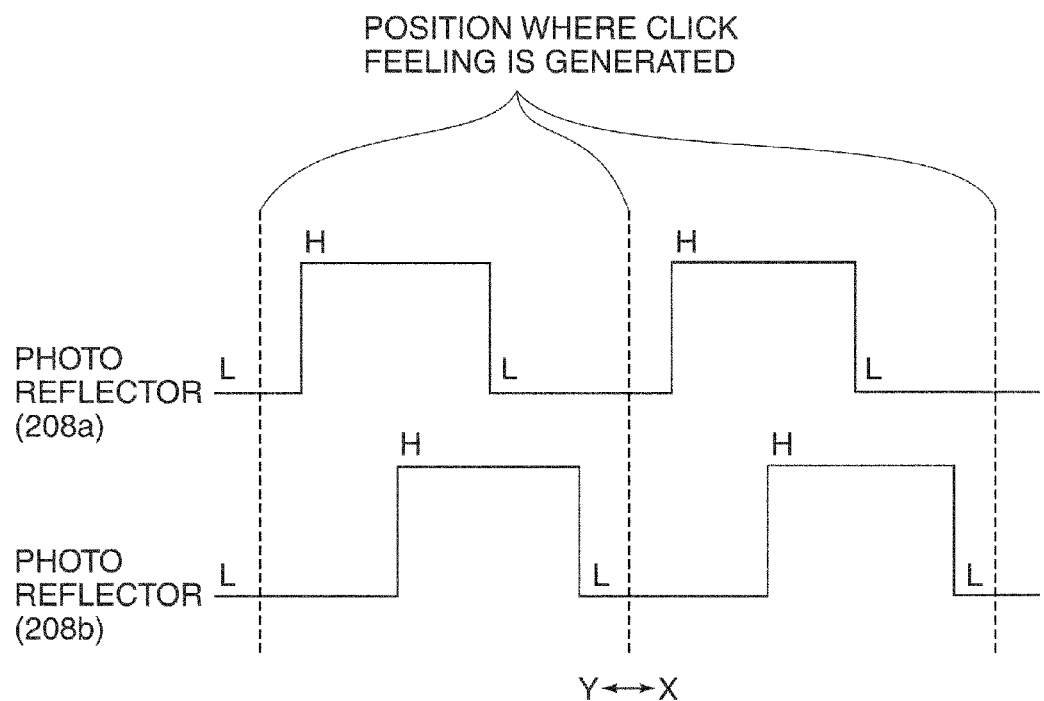
FIG. 12 is an output timing diagram of the photo reflectors appearing in FIG. 11.

Next, a description will be given of the mechanism for detecting a rotational direction and a rotational amount when the operation ring member 301 is rotationally operated, with reference to FIGS. 10 to 12. FIG. 11 is a side view showing a positional relationship between the second ring member 305, and the photo reflectors 208a and 208b, and FIG. 12 is an output timing diagram of the photo reflectors 208a and 208b.

The photo reflectors 208a and 208b are disposed such that when click feeling generation is stopped, light beam reflection positions therefor each come to a location at ¼ (1.25 degrees) of the opening width (5 degrees) on a centerline extending across each opening 305y of the second ring member 305 (see FIG. 10). Timing of a change in an output signal (reflected light detection signal) from one of the photo reflectors 208a and 208b is thus displaced by ¼ period from that of a change in an output signal from the other, which makes it possible to detect the rotational direction of the operation ring member 301 which rotates in unison with the second ring member 305.

More specifically, the light beam reflection positions for the photo reflectors 208a and 208b are, as shown in FIG. 11, where light beams emitted from the photo reflectors 208a and 208 irradiate the second ring member 305. During stoppage of click feeling generation (stoppage of the second ring member 305), the light beams from both of the photo reflectors 208a and 208b do not impinge on the second ring member 305, but are irradiated to the surface 302g of the first ring member 302 through the openings 305y. The surface 302g of the first ring member 302 is formed of a material which is difficult to reflect light (e.g. a black resin). Therefore, the light beams from both of the photo reflectors 208a and 208b are not reflected by the surface 302g, and as a result, the output signals from the photo reflectors 208a and 208b become "low".

When the second ring member 305 (operation ring member 301) is rotated clockwise or counterclockwise, the light beams emitted from the photo reflectors 208a and 208b come to be irradiated to the second ring member 305. The second ring member 305 is formed of a material having a high optical reflectivity (e.g. a metal). Therefore, the light beams emitted from the photo reflectors 208a and 208b are largely reflected by the second ring member 305, and returns to light receiving portions of the photo reflectors 208a and 208b, respectively, whereby the output signals from the photo reflectors 208a and 208b become "high".

"L" and "H" in FIG. 12 represent that each output signal is "low" and "high", respectively. The output signals from the photo reflectors 208a and 208b during stoppage of click feeling generation are both "low", and this is to stabilize the output signals during stoppage of click feeling generation. On the other hand, during click feeling generation operation, the output signals from the tow photo reflectors 208a and 208b are both "high" in each position where a click feeling is generated.

If the second ring member 305 is rotated counterclockwise as viewed in FIG. 10, when the output signal from the photo reflector 208b is switched to "high", the output signal from the photo reflector 208a remains "low". Conversely, when the output signal from the photo reflector 208b is switched to "high" in a state in which the output signal from the photo reflector 208a remains "low", the counterclockwise rotation of the second ring member 305 is detected. Similarly, when the output signal from the photo reflector 208a is switched to "high" earlier in a state in which the output signal from the photo reflector 208b remains "low", the clockwise rotation of the second ring member 305 is detected. The rotational amount of the second ring member 305 can be detected from the number of occurrences of switching of the output signals from the photo reflectors 208a and 208b from "low" to "high" (the number of occurrences of switching from "low" to "high" is necessarily equal between the photo reflectors 208a and 208b).

In the present embodiment, from a viewpoint of the size reduction of the flexible printed circuit board 207, the photo reflectors 208a and 208b are arranged in a manner adjusted to the positions of adjacent openings 305y. However, it is only necessary that the timing of switching of "low" and "high" (detection timing) is displaced by ¼ period between the output signals from the photo reflectors 208a and 208b, and it is not necessarily required to arrange the photo reflectors 208a and 208b in a manner adjusted to the positions of adjacent openings 305y.

Further, although in the present embodiment, a metal having a high optical reflectivity is used for the second ring member 305, and a resin having a low optical reflectivity (e.g. a black resin) is used for the first ring member 302, this may be reversed. More specifically, the second ring member 305 may be formed of a resin having a low optical reflectivity, and the first ring member 302 may be formed of a metal having a high optical reflectivity (e.g. die-cast). In this case, "low" and "high" in FIG. 12 change places, and hence it is possible to detect the rotational direction of the second ring member 305 depending on which of the photo reflectors 208a and 208b is switched from "high" to "low" earlier when the click feeling generation (the rotation of the second ring member 305 i.e. the operation ring member 301) is stopped.

Further, although in the present embodiment, the different openings are used for the clicking mechanism and the rotation detection mechanism, more specifically, the openings 305x having a narrower width are used for the clicking mechanism, and the openings 305y having a wider width are used for the rotation detection mechanism, this is not limitative. For example, to make the second ring member 305 smaller in diameter, the common openings configured to have a small opening width may be used both for the clicking mechanism and for the rotation detection mechanism. Further, although the photo reflectors 208a and 208b are used for detection of the rotational direction and rotational amount of the operation ring member 301, a photo interrupter can be used in place of these.

As described above, the electronic still camera according to the first embodiment enables the photographer to set desired shooting conditions by the manual operation of the operation ring 300 removably mounted on the camera housing by bayonet coupling, and then perform shooting.

Next, a second embodiment of the present invention will be described. In the second embodiment, a description will be given of a ring adapter as an accessory which can be mounted and dismounted on and from the camera housing, instead of the operation ring 300. The ring adapter is bayonet-coupled to the mount base 203, similarly to the first ring member 302 described in the first embodiment. Further, the ring adapter has a structure in which the first ring member 302 is provided with an adapter portion (ring adapter member), on which an optical accessory (e.g. a wide converter lens, a teleconverter lens, or a PL filter), described hereinafter, can be mounted. The remaining arrangement of the electronic still camera 101 is the same as that in the first embodiment, and hence description thereof is omitted.

Figure 13A:
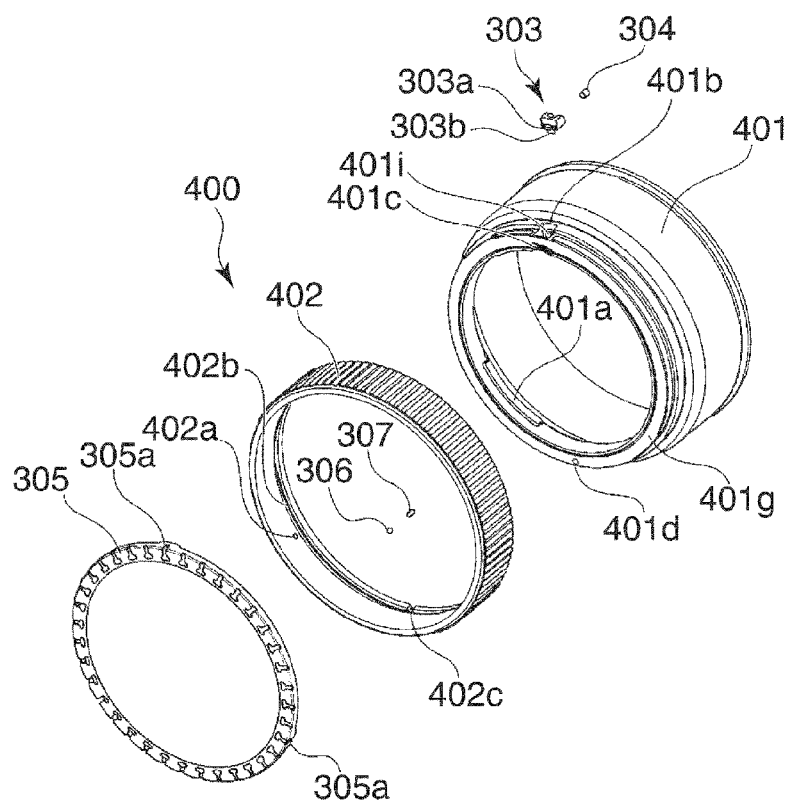
Figure 13B:
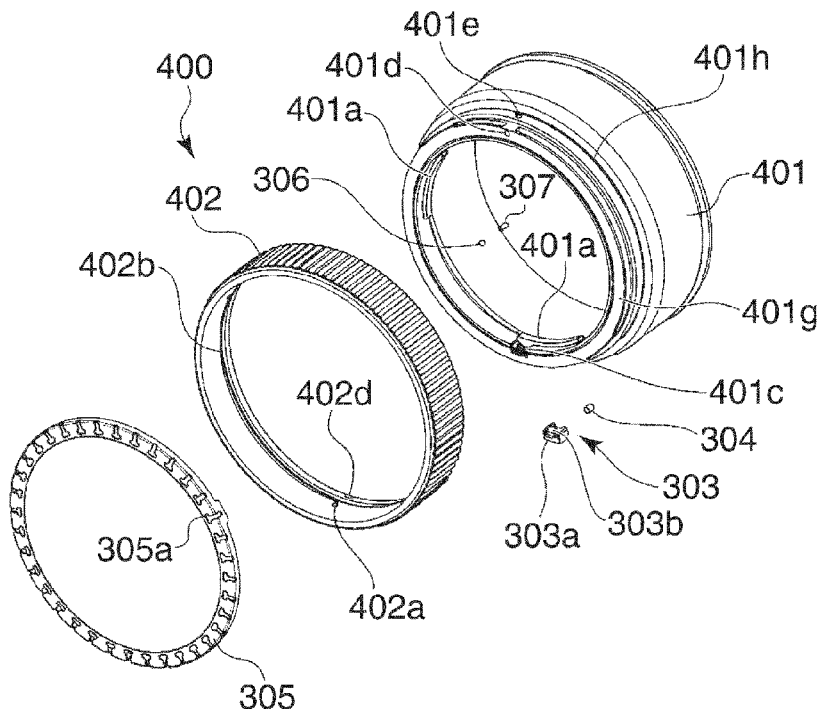

FIGS. 13A and 13B are exploded perspective views of the ring adapter, as viewed from the rear, in which FIG. 13A shows an upper side, and FIG. 13B shows a lower side. The ring adapter, denoted by reference numeral 400, basically comprises a ring adapter member 401, an adapter operation ring 402, and the second ring member 305 (which is the same as the second ring member 305 forming the operation ring 300 according to the first embodiment, and hence the same name and reference numeral are used in the second embodiment). Note that in the ring adapter 400, the same components as those of the operation ring 300 are denoted by the same reference numerals, and description thereof is omitted.

The ring adapter member 401 includes male pawl portions 401a formed at three locations for being bayonet-coupled to the mount base 203. The rotation locking member 303 is slidably fitted and latched in a recess 401b formed in the ring adapter member 401. The rotation locking spring 304 is disposed between a rib 401i of the ring adapter member 401 and the wall 303c of the rotation locking member 303 (see FIG. 5A for details).

A boss 401e formed on the ring adapter member 401 extends up to a groove 402b formed in the adapter operation ring 402 through an opening groove 402c formed in the adapter operation ring 402. Further, a pawl groove 401h formed in the ring adapter member 401 is engaged with a pawl portion 402d formed on the adapter operation ring 402, whereby the adapter operation ring 402 is retained from coming off in the optical axis direction. Further, the boss 401e formed on the ring adapter member 401 is rotatably and slidably fitted in the groove 402b formed in the adapter operation ring 402.

The clicking spring 307 and the steel ball 306 are disposed in a hole 401d formed in a surface 401g of the ring adapter member 401, and three pawl portions 402a formed on the adapter operation ring 402 are engaged with the three holes 305a formed in the second ring member 305. The adapter operation ring 402 thus made integral with the second ring member 305 is rotatably held on the ring adapter member 401.

The steel ball 306 is disposed in a position where the center thereof is substantially aligned with the center of one of the openings 305x formed in the second ring member 305, and is urged toward the second ring member 305 by the clicking spring 307. The rib 303a formed on the rotation locking member 303 is urged toward the second ring member 305 by the rotation locking spring 304, and is slidably fitted in one of the openings 305y formed in the second ring member 305. This restricts the adapter operation ring 402 and the second ring member 305 from rotating with respect to the ring adapter member 401.

Figure 14A:
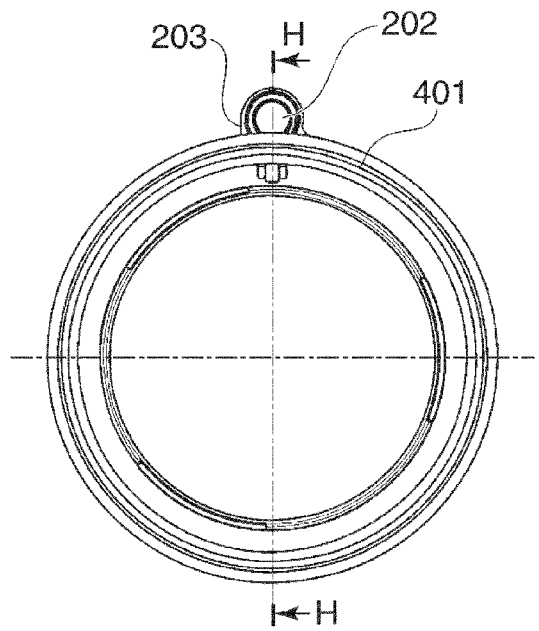
Figure 14B:
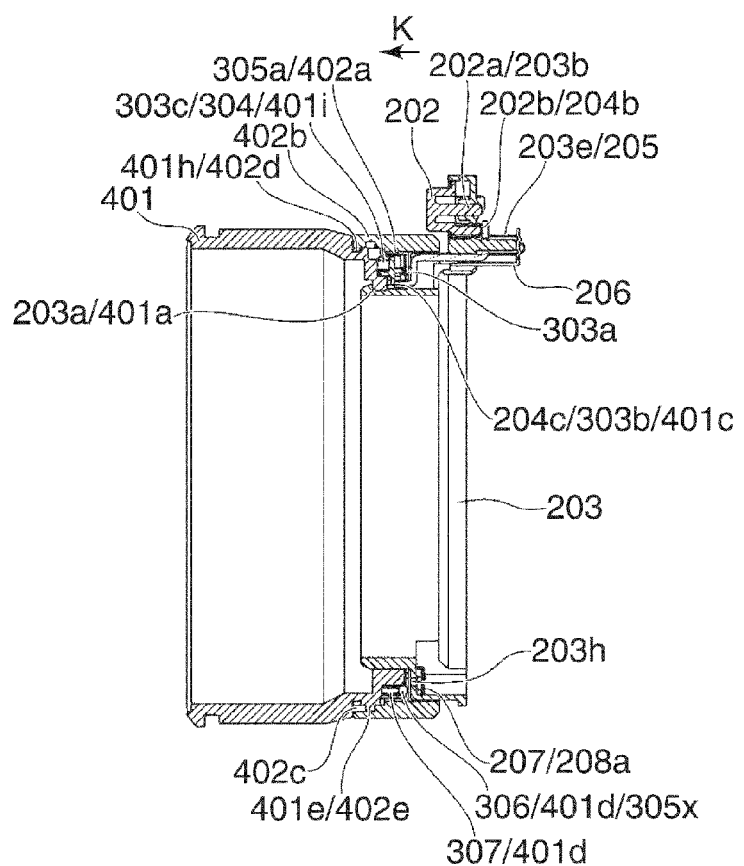

FIGS. 14A and 14B are views showing a state in which the ring adapter 400 has been mounted on the mount base 203 and is in a locked state after being bayonet-coupled, in which FIG. 14A shows a font view, and FIG. 14B shows a side cross-sectional view (taken as indicated by arrows H-H in FIG. 14A). Here, the description of the same operation as the bayonet coupling between the operation ring 300 and the mount base 203, described in the first embodiment, is omitted, as appropriate.

The three male pawl portions 401a formed on the ring adapter member 401 are engaged with the three female pawl grooves 203a formed in the mount base 203. The engaging end face 204c of the lock member 204 is moved by the urging force of the lock spring 205 in the direction of the arrow K, and is engaged with a groove 401c of the ring adapter member 401, whereby the ring adapter member 401 is held in a state restricted from rotation with respect to the mount base 203.

At the same time, the receiving surface 204b of the lock member 204 moves in the direction of the arrow K, and is brought into abutment with the boss 202b of the operation member 202, whereby the operation member 202 is moved in the direction of the arrow K. At this time, the engaging end face 204c of the lock member 204 moves the receiving surface 303b of the rotation locking member 303 against the urging force of the rotation locking spring 304. This causes the rib 303a of the rotation locking member 303 to be removed from one of the openings 305y of the second ring member 305, so that the adapter operation ring 402 and the second ring member 305 are permitted to rotate in unison. Further, when the adapter operation ring 402 is rotated, a clicking force is generated by the clicking spring 307 and the steel ball 306 disposed in the hole 302d formed in the ring adapter member 401.

Figure 15:
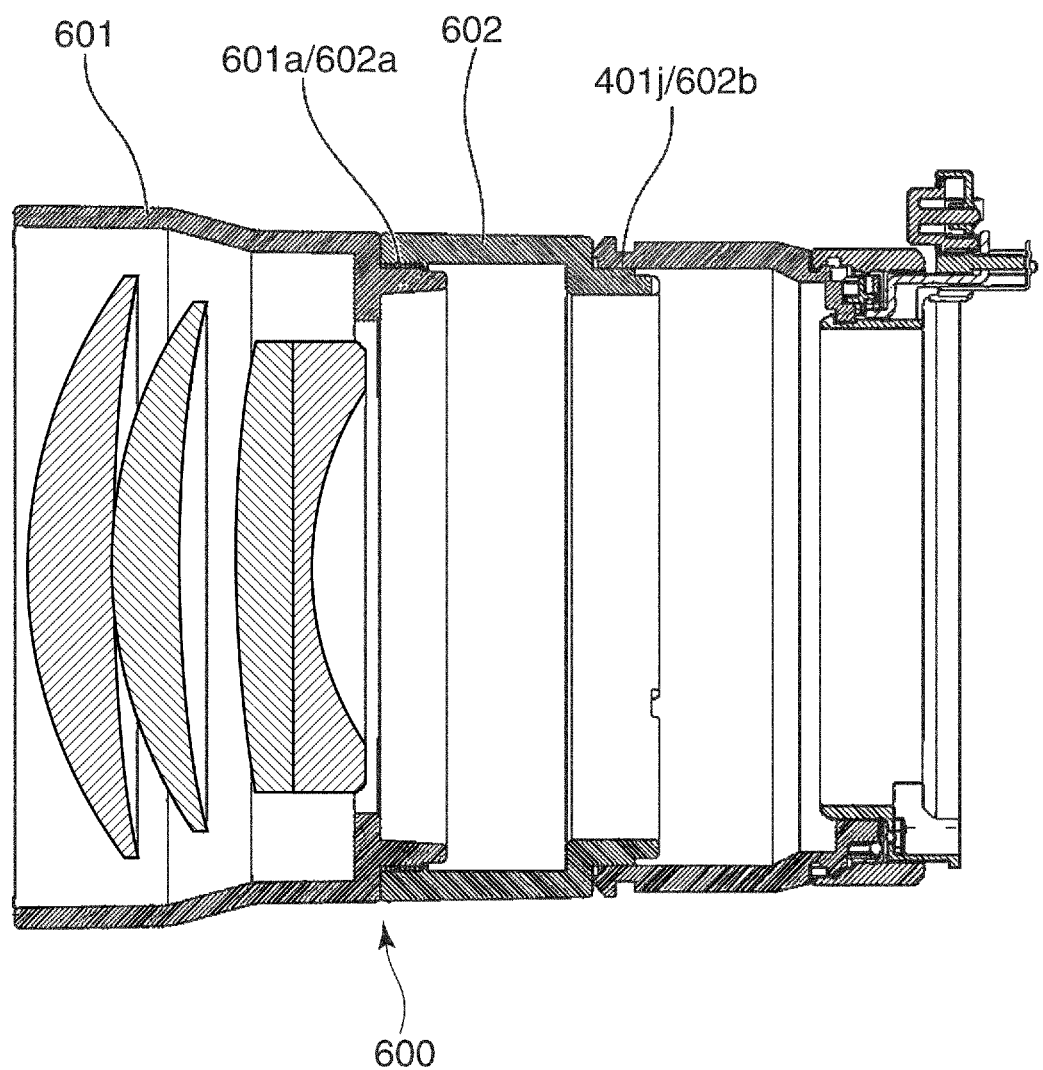
FIG. 15 is a side cross-sectional view showing a state in which a teleconverter has been mounted on the ring adapter shown in FIGS. 13A and 13B.

FIG. 15 is a side cross-sectional view showing a state in which a teleconverter as one of optical accessories has been mounted on the ring adapter 400. The teleconverter, denoted by reference numeral 600, is formed by a teleconversion lens section 601 and a conversion lens section 602. A male screw portion 601a formed on the teleconversion lens section 601 and a female screw portion 602a formed on the conversion lens section 602 are fixed by screw fastening. Further, a male screw portion 602b formed on the conversion lens section 602 and a female screw portion 401j formed on the ring adapter member 401 are fixed by screw fastening.

As described above, in the present embodiment, it is possible to develop a system in which a desired optical accessory (e.g. a wide conversion lens or a PL filter) is mounted according to shooting conditions, using the ring adapter 400 having the operation ring function.

Figure 16A:
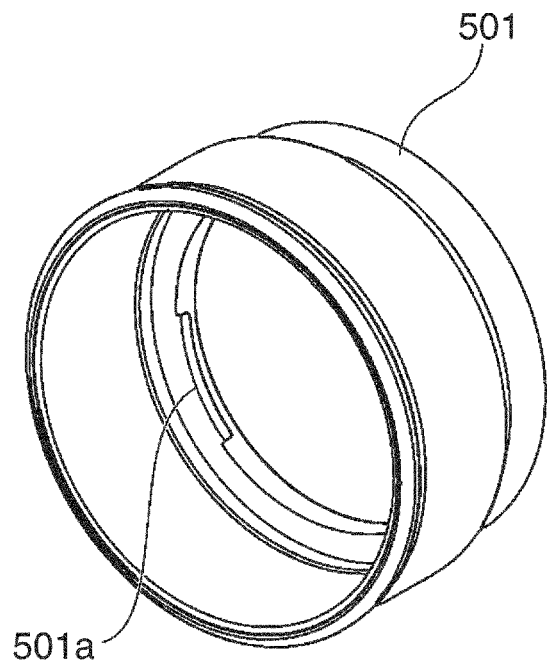
Figure 16B:
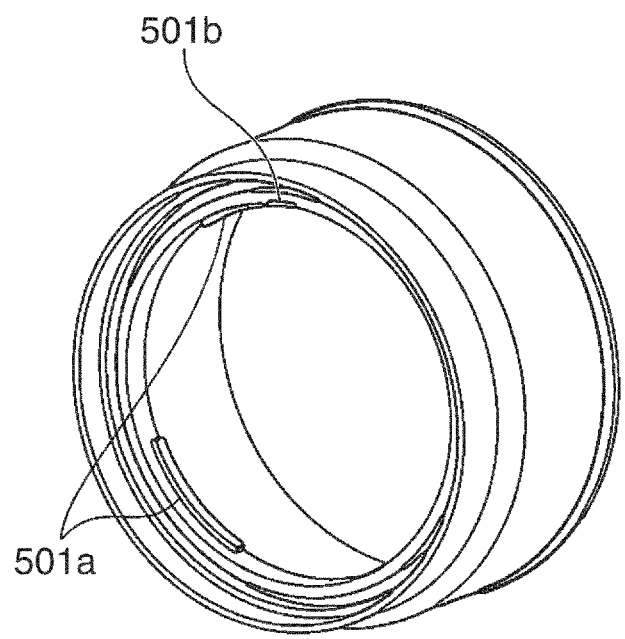
Figure 17A:
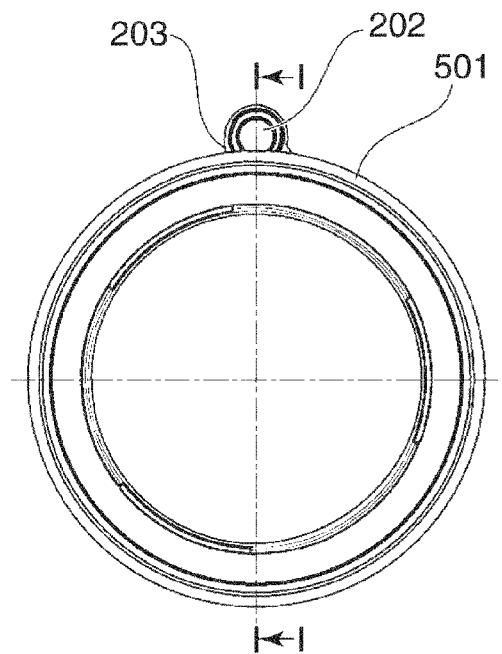
Figure 17B:
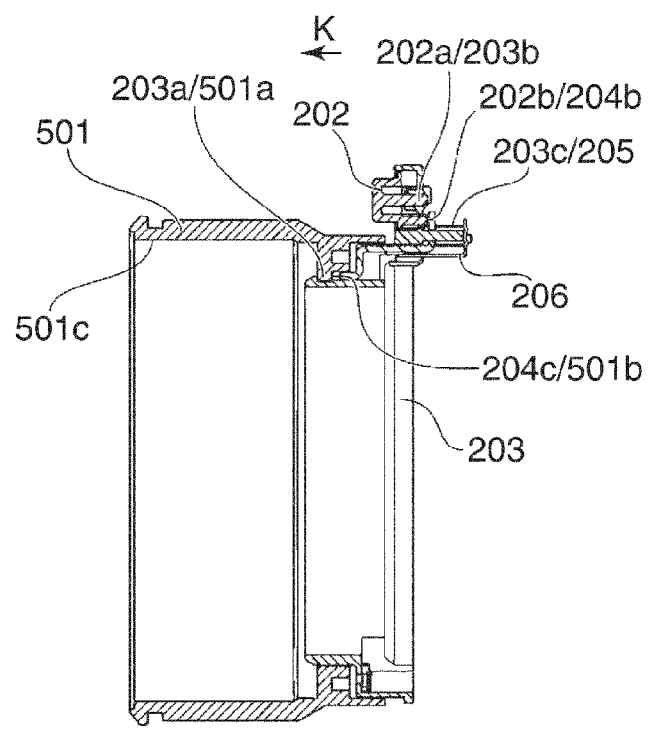

Next, a third embodiment of the present invention will be described. In the third embodiment, a description will be given of arrangement of an electronic still camera as an image pickup apparatus in which the lens adapter can be mounted and dismounted on and from the camera housing instead of the operation ring 300. FIGS. 16A and 16B are views of the lens adapter, in which FIG. 16A shows a font view, and FIG. 16B shows a rear perspective view. FIGS. 17A and 17B are views showing a state in which the lens adapter has been mounted on the mount base 203, and is in a locked state after being bayonet-coupled, in which FIG. 17A shows a front view, and FIG. 17B shows a side cross-sectional view (taken as indicated by arrows I-I in FIG. 17A). Also in the present embodiment, the description of the same operation as the bayonet coupling between the operation ring 300 and the mount base 203, described in the first embodiment, is omitted, as appropriate.

Three male pawl portions 501a formed on the lens adapter, denoted by reference numeral 501, are engaged with the female pawl grooves 203a formed in the mount base 203. The engaging end face 204c of the lock member 204 is moved by the urging force of the lock spring 205 in the direction of the arrow K, and is engaged with a groove 501b formed in the lens adapter 501. As a consequence, the lens adapter 501 is held in a state restricted from rotation respect to the mount base 203. Further, the lens adapter 501 is provided with a female screw portion 501c.

The electronic still camera according to the third embodiment makes it possible to mount a desired optical accessory, such as the teleconversion lens section 601 or the conversion lens section 602, described with reference to FIG. 15, depending on shooting conditions, and perform shooting.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

For example, in the present invention, it is also possible to use a lens adapter without the conventional operation ring function. Further, the present invention can be applied to various kinds of cameras, such as a single-lens reflex camera, a lens shutter camera, a video camera, and a digital camera. Further, the present invention can be applied to optical devices other than cameras, and other devices, and further to a device applied to these cameras, optical devices, and other devices, and components constituting these devices.

This application claims the benefit of Japanese Patent Application No. 2011-201673, filed Sep. 15, 2011, which is hereby incorporated by reference herein in its entirety.

What is claimed is:

1. An image pickup apparatus comprising:
a first bayonet coupling section which is formed around a lens barrel;
a first member configured to have a second bayonet coupling section formed thereon, said second bayonet coupling section being capable of being engaged with said first bayonet coupling section;
a rotational operation member configured to rotate with respect to said first member;
a second member configured to rotate in unison with said rotational operation member in a case when said rotational operation member is rotated;
a detection unit configured to detect rotation of said second member;
a first lock member configured to restrict rotation of said first member with respect to said first bayonet coupling section in a case when said first bayonet coupling section and said second bayonet coupling section are engaged with each other; and
a second lock member configured to restrict rotation of said rotational operation member and said second member with respect to said first member in accordance with an operation for releasing rotation restriction of said first member.

2. The image pickup apparatus according to claim 1, wherein a plurality of first openings are formed in said second member at regular circumferentially spaced intervals; and
wherein said second lock member restricts rotation of said rotational operation member and said second member with respect to said first member in a case when said second lock member is fitted in one of said first openings.

3. The image pickup apparatus according to claim 2, wherein said detection unit includes a first photo reflector and a second photo reflector configured to emit respective light beams to said second member, and detect reflective lights which are reflected by said second member, and reflective lights which pass through said first openings and are thereby reflected by said first member,
wherein respective surfaces of said first member and said second member that are to be irradiated with the respective light beams emitted from said first photo reflector and said second photo reflector are different in reflectivity to the light beams,
wherein in a case when said rotational operation member is rotated, a period at which a reflective light from said second member and a reflective light from said first member are alternately detected is displaced by ¼ period between said first photo reflector and said second photo reflector, and
wherein a rotational direction of said rotational operation member is detected based on displacement of timing of switching between detection of the reflective light from said second member and detection of the reflective light from said first member, between said first photo reflector and said second photo reflector.

4. The image pickup apparatus according to claim 3, wherein a rotational amount of said rotational operation member is detected based on the number of times of switching between detection of the reflective light from said second member and detection of the reflective light from said first member by each of said first photo reflector and said second photo reflector.

5. The image pickup apparatus according to claim 2, wherein a plurality of second openings each having a smaller width than said first openings are formed in said second member at regular circumferentially spaced intervals,
the image pickup apparatus further comprising:
a ball which is disposed such that part thereof sinks in one of the second openings formed in said second member, and
a clicking spring configured to urge said ball toward said second member, and
wherein in a case when said second member rotates with respect to said first member, a click feeling is provided by switching of a state in which said ball is engaged with one of the second openings of said second member and a state in which said ball is slid on a surface of said second member.

6. The image pickup apparatus according to claim 1, wherein said first member includes an adapter portion on which an optical accessory can be mounted.

7. The image pickup apparatus according to claim 6, wherein the optical accessory is one of a wide converter lens, a teleconverter lens, and a filter.

8. An accessory that can be mounted on an image pickup apparatus having a first bayonet coupling section formed around a lens barrel, comprising:
a first member configured to have a second bayonet coupling section formed thereon, said second bayonet coupling section being capable of being engaged with said first bayonet coupling section;
a rotational operation member configured to rotate with respect to said first member;

a second member configured to rotate in unison with said rotational operation member in a case when said rotational operation member is rotated; and a lock member configured to restrict rotation of said rotational operation member and said second member with respect to said first member in accordance with an operation for dismounting the accessory from the image pickup apparatus.

9. The accessory according to claim 8, wherein a plurality of first openings are formed in said second member at regular circumferentially spaced intervals, and wherein said second lock member restricts rotation of said rotational operation member and said second member with respect to said first member in a case when said lock member is fitted in one of said first openings.

10. The accessory according to claim 9, wherein a plurality of second openings each having a smaller width than said first openings are formed in said second member at regular circumferentially spaced intervals.

11. The accessory according to claim 8, wherein said first member includes an adapter portion on which an optical accessory can be mounted.

12. The accessory according to claim 11, wherein the optical accessory is one of a wide converter lens, a teleconverter lens, and a filter.

13. An image pickup apparatus comprising:
a first bayonet coupling section which is formed around a lens barrel;
a first member configured to have a second bayonet coupling section formed thereon, said second bayonet coupling section being capable of being engaged with said first bayonet coupling section;
a rotational operation member configured to rotate with respect to said first member;
a second member configured to rotate in unison with said rotational operation member in a case when said rotational operation member is rotated;
a detection unit configured to detect rotation of said second member;
a first lock member configured to restrict rotation of said first member with respect to said first bayonet coupling section; and
a second lock member configured to restrict rotation of said rotational operation member and said second member with respect to said first member,
wherein in a case when said first bayonet coupling section and said second bayonet coupling section are engaged with each other, said first lock member restricts rotation of said first member with respect to said first bayonet coupling section, and
wherein in a case when said first lock member does not restrict rotation of said first member with respect to said first bayonet coupling section, said second lock member restricts rotation of said rotational operation member and said second member with respect to said first member.

14. The image pickup apparatus according to claim 13, wherein a plurality of first openings are formed in said second member at regular circumferentially spaced intervals; and wherein said second lock member restricts rotation of said rotational operation member and said second member with respect to said first member in a case when said second lock member is fitted in one of said first openings.

15. The image pickup apparatus according to claim 14, wherein said detection unit includes a first photo reflector and a second photo reflector configured to emit respective light beams to said second member, and detect reflective lights which are reflected by said second member, and reflective lights which pass through said first openings and are thereby reflected by said first member, wherein respective surfaces of said first member and said second member that are to be irradiated with the respective light beams emitted from said first photo reflector and said second photo reflector are different in reflectivity to the light beams, wherein in a case when said rotational operation member is rotated, a period at which a reflective light from said second member and a reflective light from said first member are alternately detected is displaced by ¼ period between said first photo reflector and said second photo reflector, and wherein a rotational direction of said rotational operation member is detected based on displacement of timing of switching between detection of the reflective light from said second member and detection of the reflective light from said first member, between said first photo reflector and said second photo reflector.

16. The image pickup apparatus according to claim 15, wherein a rotational amount of said rotational operation member is detected based on the number of times of switching between detection of the reflective light from said second member and detection of the reflective light from said first member by each of said first photo reflector and said second photo reflector.

17. The image pickup apparatus according to claim 14, wherein a plurality of second openings each having a smaller width than said first openings are formed in said second member at regular circumferentially spaced intervals, the image pickup apparatus further comprising:
a ball which is disposed such that part thereof sinks in one of the second openings formed in said second member, and
a clicking spring configured to urge said ball toward said second member, and
wherein in a case when said second member rotates with respect to said first member, a click feeling is provided by switching of a state in which said ball is engaged with one of the second openings of said second member and a state in which said ball is slid on a surface of said second member.

18. The image pickup apparatus according to claim 13, wherein said first member includes an adapter portion on which an optical accessory can be mounted.

19. The image pickup apparatus according to claim 18, wherein the optical accessory is one of a wide converter lens, a teleconverter lens, and a filter.

20. An accessory that can be mounted on an image pickup apparatus having a first bayonet coupling section formed around a lens barrel, comprising:
a first member configured to have a second bayonet coupling section formed thereon, said second bayonet coupling section being capable of being engaged with said first bayonet coupling section;
a rotational operation member configured to rotate with respect to said first member;
a second member configured to rotate in unison with said rotational operation member in a case when said rotational operation member is rotated; and
a lock member configured to restrict rotation of said rotational operation member and said second member with respect to said first member,
wherein in a case when said the accessory is not mounted to the image pickup apparatus, said lock member restricts rotation of said rotational operation member and said second member with respect to said first member.

21. The accessory according to claim 20, wherein a plurality of first openings are formed in said second member at regular circumferentially spaced intervals, and wherein said second lock member restricts rotation of said rotational operation member and said second member with respect to said first member in a case when said lock member is fitted in one of said first openings.

22. The accessory according to claim 21, wherein a plurality of second openings each having a smaller width than said first openings are formed in said second member at regular circumferentially spaced intervals.

23. The accessory according to claim 20, wherein said first member includes an adapter portion on which an optical accessory can be mounted.

24. The accessory according to claim 23, wherein the optical accessory is one of a wide converter lens, a teleconverter lens, and a filter.

* * * * *